US011103856B2

(12) United States Patent
Snell et al.

(10) Patent No.: US 11,103,856 B2
(45) Date of Patent: Aug. 31, 2021

(54) AROMATIZATION CATALYST AND METHODS OF MAKING AND USING SAME

(71) Applicant: Chevron Phillips Chemical Company LP, The Woodlands, TX (US)

(72) Inventors: Ryan W. Snell, Jubail (SA); Gabriela Alvez-Manoli, Kingwood, TX (US)

(73) Assignee: Chevron Phillips Chemical Company, LP, The Woodlands, TX (US)

(*) Notice: Subject to any disclaimer, the term of this patent is extended or adjusted under 35 U.S.C. 154(b) by 0 days.

(21) Appl. No.: 15/972,757

(22) Filed: May 7, 2018

(65) Prior Publication Data
US 2019/0336951 A1    Nov. 7, 2019

(51) Int. Cl.
| *B01J 29/62* | (2006.01) |
| *B01J 27/13* | (2006.01) |
| *B01J 29/60* | (2006.01) |
| *B01J 37/00* | (2006.01) |
| *B01J 37/02* | (2006.01) |
| *B01J 37/04* | (2006.01) |
| *B01J 37/06* | (2006.01) |
| *B01J 37/08* | (2006.01) |
| *B01J 37/24* | (2006.01) |
| *B01J 37/26* | (2006.01) |
| *C10G 55/00* | (2006.01) |
| *B01J 29/08* | (2006.01) |
| *B01J 29/63* | (2006.01) |
| *B01J 29/74* | (2006.01) |
| *B01J 29/76* | (2006.01) |
| *B01J 35/00* | (2006.01) |
| *B01J 35/10* | (2006.01) |
| *B01J 37/22* | (2006.01) |

(52) U.S. Cl.
CPC ............. *B01J 27/13* (2013.01); *B01J 29/082* (2013.01); *B01J 29/084* (2013.01); *B01J 29/085* (2013.01); *B01J 29/087* (2013.01); *B01J 29/088* (2013.01); *B01J 29/60* (2013.01); *B01J 29/62* (2013.01); *B01J 29/63* (2013.01); *B01J 29/7415* (2013.01); *B01J 29/7469* (2013.01); *B01J 29/7615* (2013.01); *B01J 29/7669* (2013.01); *B01J 35/0006* (2013.01); *B01J 35/1038* (2013.01); *B01J 37/0009* (2013.01); *B01J 37/0018* (2013.01); *B01J 37/0201* (2013.01); *B01J 37/0203* (2013.01); *B01J 37/0205* (2013.01); *B01J 37/0207* (2013.01); *B01J 37/0209* (2013.01); *B01J 37/0236* (2013.01); *B01J 37/04* (2013.01); *B01J 37/06* (2013.01); *B01J 37/08* (2013.01); *B01J 37/22* (2013.01); *B01J 37/24* (2013.01); *B01J 37/26* (2013.01); *C10G 55/00* (2013.01); *B01J 2229/20* (2013.01); *B01J 2229/34* (2013.01); *B01J 2229/40* (2013.01); *B01J 2229/42* (2013.01); *C10G 2400/30* (2013.01)

(58) Field of Classification Search
CPC ...... B01J 29/082; B01J 29/084; B01J 29/085; B01J 29/087; B01J 29/088; B01J 29/123; B01J 29/126; B01J 29/143; B01J 29/146; B01J 29/22; B01J 29/24; B01J 29/44; B01J 29/46; B01J 29/62; B01J 29/63; B01J 29/7415; B01J 29/7469; B01J 29/7615; B01J 29/7669; B01J 2229/20; B01J 2229/34; B01J 2229/40; B01J 2229/42; B01J 35/0006; B01J 35/1038; B01J 37/0009; B01J 37/0201; B01J 37/0203; B01J 37/0205; B01J 37/0207; B01J 37/0209; B01J 37/08; B01J 37/22; B01J 37/24; B01J 37/26
USPC ... 502/63, 64, 69, 66, 71, 73, 74, 77, 78, 79
See application file for complete search history.

(56) References Cited

U.S. PATENT DOCUMENTS

| 3,216,789 | A | | 11/1965 | Breck | |
| 4,458,025 | A | * | 7/1984 | Lee | ......... B01J 29/064 502/66 |
| 5,106,803 | A | * | 4/1992 | Mohr | ......... B01J 29/62 502/66 |
| 5,558,851 | A | | 9/1996 | Miller | |
| 6,190,539 | B1 | | 2/2001 | Holtermann et al. | |
| 6,207,042 | B1 | * | 3/2001 | Holtermann | ........ B01J 29/064 208/135 |

(Continued)

FOREIGN PATENT DOCUMENTS

| WO | 20000030748 | 6/2000 |
| WO | 20140052299 | 4/2014 |

OTHER PUBLICATIONS

Jongpatiwut et al., "n-Octane aromatization on a Pt/LEL catalyst prepared by vapor-phase impregnation", Journal of Catalysis 218 (2003), pp. 1-11.*

(Continued)

*Primary Examiner* — Elizabeth D Wood
(74) *Attorney, Agent, or Firm* — Conley Rose, P.C.

(57) ABSTRACT

A process of making an aromatization catalyst comprising: (a) mixing a zeolite, a binder, and water to form a mixture; (b) extruding the mixture to form a green extrudate; (c) drying the green extrudate to form a dried green extrudate; (d) calcining the dried green extrudate to form a support, wherein calcining the dried green extrudate is the only calcination step in the process; (e) washing the support to form a washed support; (f) drying the washed support to form a dried washed support; (g) impregnating the dried washed support with a Group 8-10 transition metal compound and at least one halide-containing compound to form a metalized-halided material; and (h) vacuum drying the metalized-halided material to form a dried metalized-halided material which is the aromatization catalyst.

10 Claims, 6 Drawing Sheets

(56) References Cited

U.S. PATENT DOCUMENTS

| | | | |
|---|---|---|---|
| 7,902,105 B2 | 3/2011 | Khare | |
| 8,263,518 B2 | 9/2012 | Khare | |
| 8,461,404 B2 | 6/2013 | Khare | |
| 2013/0035530 A1* | 2/2013 | Khare | B01J 29/061 585/419 |
| 2014/0371500 A1* | 12/2014 | Khare | B01J 37/22 585/321 |
| 2017/0128920 A1* | 5/2017 | Wu | B01J 29/62 |
| 2018/0065115 A1* | 3/2018 | Alvez-Manoli | B01J 29/068 |
| 2018/0170837 A1* | 6/2018 | Wu | C07C 5/417 |

OTHER PUBLICATIONS

"Group notation revised in periodic table," Feb. 4, 1985, C&EN, p. 27.

Besoukhanova, Cvedana, et al., "Platinum-Zeolite Interactions in Alkaline L Zeolites, Correlations between Catalytic Activity and Platinum State," 1981, vol. 77, pp. 1595-1604, J. Chem. Soc., Faraday Trans. 1.

Brunauer, Stephen, et al., "Adsorption of Gases in Multimolecular Layers," Journal of the American Chemical Society. 1938, vol. 60, pp. 309-319.

De Boer, J.H., et al., "The t-curve of Multimolecular N2-adsorption," Journal of Colloid and Interface Science, 1966, vol. 21, No. 4, pp. 405-414.

Harkins, William D., et al., "Surfaces of Solids. XIII. A Vapor Adsorption Method for the Determination of the Area of a Solid without the Assumption of a Molecular Area, and the Areas Occupied by Nitrogen and Other Molecules on the Surface of a Solid," Journal of the American Chemical Society, 1944, vol. 66, No. 8, pp. 1366-1373.

Lippens, B.C., et al., "Studies on Pore Systems in Catalysts: V. The t Method," Journal of Catalysis, 1965, vol. 4, No. 3, pp. 319-323.

International Search Report & Written Opinion PCT/US2019/028134, dated Jun. 13, 2019, 11 pages.

* cited by examiner

AROMATIZATION CATALYST AND METHODS OF MAKING AND USING SAME

FIELD

The present disclosure relates to the production of aromatic compounds and more particularly to an aromatization catalyst and methods of making and using same.

BACKGROUND

The catalytic conversion of hydrocarbons into aromatic compounds, referred to as aromatization, is an important industrial process used to produce fundamental building block chemicals on which a large portion of the chemical industry is based. Aromatization reactions may include the dehydrogenation, isomerization, and hydrocracking of hydrocarbons. These reactions are generally conducted in one or more aromatization reactors containing one or more aromatization catalysts. These aromatization catalysts may increase the selectivity to desired aromatics, and/or the conversion rates of the reactions to the desired aromatic compounds. Catalyst production can be a very laborious multistep process. Thus, an ongoing need exists for improved methods of producing catalysts such as aromatization catalysts.

SUMMARY

Disclosed herein is a process of making an aromatization catalyst comprising: (a) mixing a zeolite, a binder, and water to form a mixture; (b) extruding the mixture to form a green extrudate; (c) drying the green extrudate to form a dried green extrudate; (d) calcining the dried green extrudate to form a support, wherein calcining the dried green extrudate is the only calcination step in the process; (e) washing the support to form a washed support; (f) drying the washed support to form a dried washed support; (g) impregnating the dried washed support with a Group 8-10 transition metal compound and at least one halide-containing compound to form a metalized-halided material; and (h) vacuum drying the metalized-halided material to form a dried metalized-halided material which is the aromatization catalyst.

Also disclosed herein is a process of making an aromatization catalyst comprising (a) mixing a zeolite, a binder, and water to form a mixture; (b) extruding the mixture to form a green extrudate; (c) drying the green extrudate to form a dried green extrudate; (d) calcining the dried green extrudate to form a support, wherein calcining the dried green extrudate is the first of only two calcination steps in the process; (e) washing the support to form a washed support; (f) drying the washed support to form a dried washed support; (g) calcining the dried washed support to form a second calcined support, wherein calcining the dried washed support is the second of only two calcination steps in the process; (h) impregnating the second calcined support with a Group 8-10 transition metal compound and at least one halide-containing compound to form a metalized-halided material; and (i) vacuum drying the metalized-halided material to form a dried metalized-halided material which is the aromatization catalyst.

Also disclosed herein is a process of making an aromatization catalyst, the process comprising (a) mixing a zeolite, a binder, and water to form a mixture; (b) extruding the mixture to form a green extrudate; (c) drying the green extrudate to form a dried green extrudate; (d) calcining the dried green extrudate to from a support, wherein calcining the dried green extrudate is the first of only two calcination steps in the process; (e) washing the support to from a washed support; (f) drying the washed support to form a dried washed support; (g) impregnating the dried washed support with a Group 8-10 transition metal compound and at least one halide-containing compound to form a metalized-halided material; (h) vacuum_drying the metalized-halided material to form a dried metalized-halided material; and (i) calcining the dried metalized-halided material to form an aromatization catalyst, wherein calcining the dried metalized-halided material is the second of only two calcination steps in the process.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
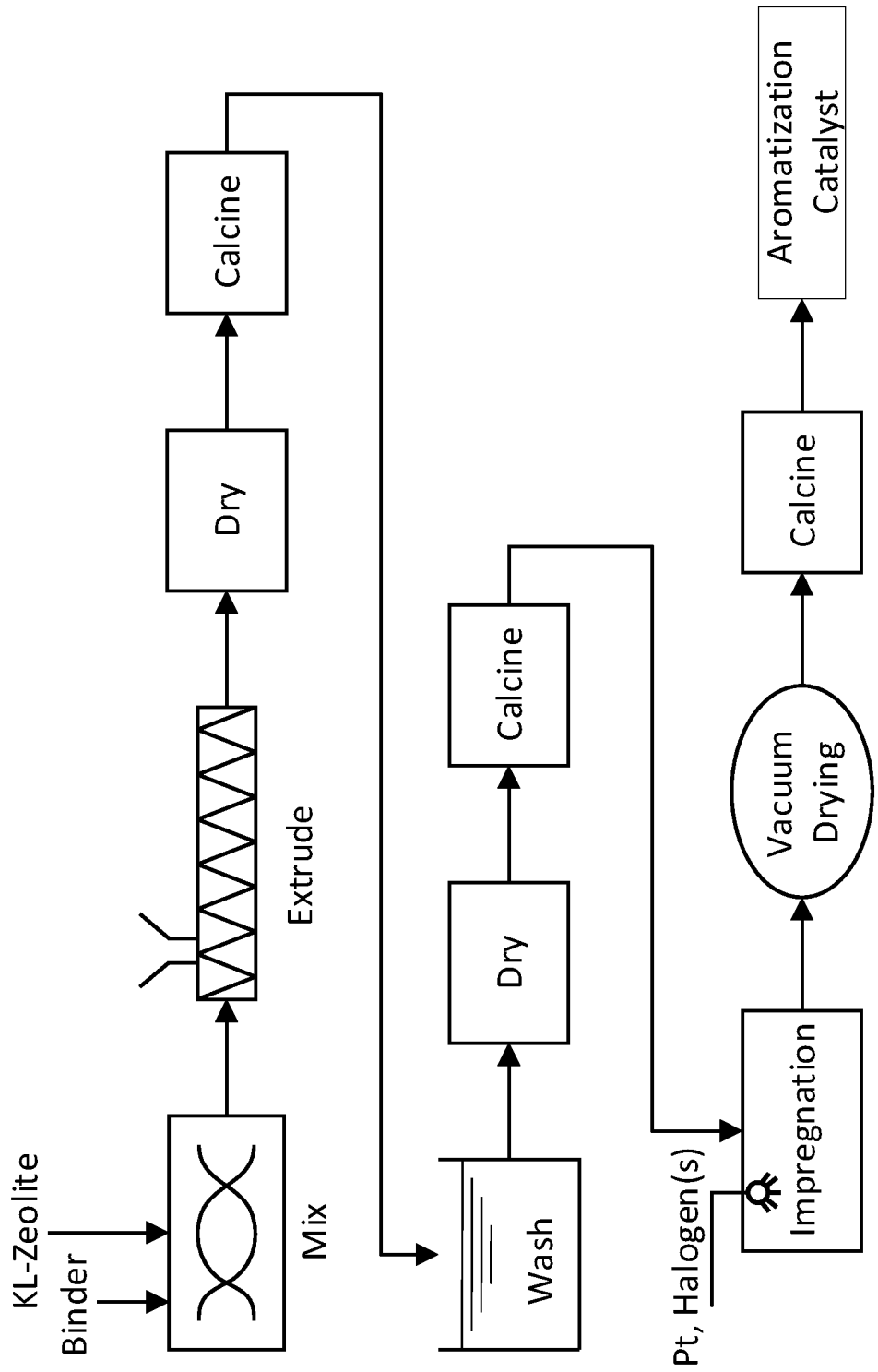
FIG. 1 is a schematic of a process for conventional preparation of an aromatization catalyst.

It should be understood at the outset that although an illustrative implementation of one or more aspects are provided below, the disclosed systems and/or methods can be implemented using any number of techniques, whether currently known or in existence. The disclosure should in no way be limited to the illustrative implementations, drawings, and techniques illustrated below, including the exemplary designs and implementations illustrated and described herein, but can be modified within the scope of the appended claims along with their full scope of equivalents.

Herein, groups of elements of the periodic table are indicated using the numbering scheme indicated in the version of the periodic table of elements published in *Chemical and Engineering News*, 63(5), 27, 1985, unless otherwise stated. In some instances, a group of elements can be indicated using a common name assigned to the group; for example, alkali metals for Group 1 elements, alkaline earth metals for Group 2 elements, transition metals for Group 3-12 elements, and halogens for Group 17 elements.

Disclosed herein are aromatization catalysts comprising a catalytically active metal, at least one halide, and a support and methods of making same. In an aspect, a method of making an aromatization catalyst comprises at most two calcination steps before final recovery of an aromatization catalyst at the end of the production process. In an aspect, a method of making an aromatization catalyst comprises at most a single calcination step before final recovery of an aromatization catalyst at the end of the production process. In an aspect, a method of making an aromatization catalyst excludes a third calcination step before final recovery of an aromatization catalyst at the end of the production process. In an aspect, the methods disclosed herein result in the production of an aromatization catalyst in a time frame that is reduced when compared to an otherwise similar methodology involving more than two calcination steps. The aromatization catalysts produced by the methods disclosed herein are termed rapid production aromatization catalysts and designated "RP-AC."

In an aspect, an aromatization catalyst (e.g. RP-AC) of the type disclosed herein comprises a support, one or more catalytically active metals, and one or more halides. The aromatization catalyst (e.g. RP-AC) may comprise a support of an oxide of a metal or metalloid. In an aspect, the support further comprises a zeolite. The term "zeolite" generally refers to a particular group of crystalline metal aluminosilicates. These zeolites exhibit a network of $SiO_4$ and $AlO_4$ tetrahedra in which aluminum and silicon atoms are cross-linked in a three-dimensional framework by sharing oxygen atoms. In the framework, the ratio of oxygen atoms to the total of aluminum and silicon atoms is equal to 2. The framework exhibits a negative electrovalence that typically is balanced by the inclusion of cations within the crystal such as metals, alkali metals, alkaline earth metals, or hydrogen. Thus, zeolites are a group of natural or synthetic aluminosilicate minerals that typically contain alkali and alkaline metals. For example, the zeolites may exhibit a characteristic framework structure that encloses interconnected cavities occupied by ion-exchangeable large metal cations such as potassium and water molecules permitting reversible dehydration. The actual formula of the zeolite may vary without changing the crystalline structure. In an aspect, the mole ratio of silicon to aluminum (Si/Al) in the zeolite may vary from about 1.0 to about 3.5.

In an aspect, the support and/or the aromatization catalyst can comprise a medium pore or large pore zeolite, alternatively a large pore zeolite. The term "large-pore zeolite" as used herein refers to a zeolite having an effective pore diameter of from about 6 Angstroms (Å) (0.6 nm) to about 15 Å (1.5 nm), alternatively from about 7 Å (0.7 nm) to about 9 Å (0.9 nm). Large pore crystalline zeolites suitable for use in this disclosure include without limitation L-zeolite, X-zeolite, Y-zeolite, omega zeolite, beta zeolite, ZSM-4, ZSM-5, ZSM-10, ZSM-12, ZSM-20, REY, USY, RE-USY, LZ-210, LZ-210-A, LZ-210-M, LZ-210-T, SSZ-24, SSZ-26, SSZ-31, SSZ-33, SSZ-35, SSZ-37, SSZ-41, SSZ-42, SSZ-44, MCM-58, mordenite, faujasite, or a combination thereof. In an aspect, the large pore zeolite has an isotypic framework structure. In an aspect, the support comprises an L-zeolite. L-type zeolite aromatization catalysts are a sub-group of zeolitic aromatization catalysts. Typical L-type zeolites contain mole ratios of oxides in accordance with the following formula:

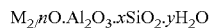

$$M_{2/n}O \cdot Al_2O_3 \cdot xSiO_2 \cdot yH_2O$$

wherein "M" designates at least one exchangeable cation such as barium, calcium, cerium, lithium, magnesium, potassium, sodium, strontium, and zinc as well as non-metallic cations like hydronium and ammonium ions which may be replaced by other exchangeable cations without causing a substantial alteration of the basic crystal structure of the L-type zeolite. The "n" in the formula represents the valence of "M", "x" is 2 or greater; and "y" is the number of water molecules contained in the channels or interconnected voids with the zeolite. L-zeolite, its X-ray diffraction pattern, its properties, and methods for its preparation are described in detail in, U.S. Pat. No. 3,216,789, the content of which is hereby incorporated by reference. In an aspect, the support or RP-AC has a micropore volume of from about 0.04 cc/g to about 0.10 cc/g.

In an aspect, the support comprises an L-zeolite wherein M is potassium and is hereafter referred to as a KL-zeolite. In an aspect, the support and/or the aromatization catalyst comprises a crystalline zeolite powder, e.g., a KL-zeolite powder, having a mean particle size of less than about 6 microns, alternatively less than about 5 microns, alternatively less than about 4 microns, alternatively less than about 3 microns, or alternatively from about 5 microns to about 2 microns; a median particle size of less than about 5 microns, alternatively less than about 4 microns, alternatively less than about 3 microns, alternatively less than about 2 microns, alternatively from about 5 microns to about 2 microns; or a combination of the mean and median particle sizes disclosed. Zeolite powders having the disclosed mean and median particle sizes may be prepared utilizing any suitable methodology for the preparation of a zeolite. For example, the zeolite may be prepared by techniques such as spray drying or crystallization. In an aspect, the zeolite may then be contacted with other components or treated (e.g., calcined) to form a support.

In an aspect, the zeolite is associated with a binder that functions to join or cement the zeolite crystals together and provide a unified support. A binder suitable for use with the zeolite can comprise synthetic or naturally occurring zeolites; silica; alumina; clays such as montmorillonite and kaolin; the refractory oxides of metals of Groups 4 and 14 of the Periodic Table of the Elements; oxides of silicon, titanium, zirconium; or a combination thereof. In an aspect, the binder comprises silica. In an aspect, the silica may be contacted with the zeolite powder in the form of a silica sol. A silica sol herein comprises dispersed silica particles in water. The silica sol may be provided in about 20 wt. % to about 30 wt. % aqueous solution having a pH of from about 9.0 to about 10.5 with a viscosity of equal to or less than about 20 mPa·s at 25° C., alternatively from about 1 mPa·s to about 20 mPa·s at 25° C.

A support (e.g., a KL-zeolite and binder) and/or an aromatization catalyst of the type disclosed herein (e.g., RP-AC) may be characterized by a crush strength of from about 4.5 lbs. to about 15 lbs., alternatively from about 5 lbs. to about 12 lbs., or alternatively from about 5 lbs. to about 10 lbs. as determined in accordance with ASTM method D 6175-98.

In an aspect, the aromatization catalyst (e.g. an RP-AC) can comprise one or more catalytically active metals. Herein the disclosure can refer to a metal and a catalytically active metal. In the various aspects disclosed herein, it is to be expressly understood that the terms "metal" and "catalytically active metal" are used interchangeably and are meant to refer to a metal that catalyzes an aromatization reaction as part of the aromatization catalyst (e.g. RP-AC). Nonlimiting examples of catalytically active metals suitable for use in the present disclosure include Group 8, Group 9, and Group 10 transition metals. In an aspect, the catalytically active metals can comprise iron, cobalt, nickel, ruthenium, rhodium, palladium, osmium, iridium, platinum, or a combination thereof. In an aspect, the catalytically active metal can comprise a Group 8 transition metal. In an aspect, the catalytically active metal comprises platinum (Pt).

In an aspect, the catalytically active metal can be present in the aromatization catalyst (e.g. RP-AC) in an amount of from about 0.01 wt. % to about 15 wt. %, alternatively from about 0.1 wt. % to about 50 wt. %, alternatively from about 0.05 wt. % to about 10 wt. %, alternatively from about 0.1 wt. % to about 5 wt. %, alternatively from about 0.2 wt. % to about 3 wt. %, or alternatively from about 0.3 wt. % to about 2 wt. %, based on the total weight of the aromatization catalyst (e.g., RP-AC).

In an aspect, the aromatization catalyst (e.g. RP-AC) can comprise one or more halides. Nonlimiting examples of halides suitable for use in the present disclosure include chloride, fluoride, bromide, iodide, or a combination thereof. Such halides may be introduced as a halide-containing compound such as a chloride-containing compound, a fluoride-containing compound, a bromide-containing compound, an iodide-containing compound, etc. The halide-containing compound may be introduced as an ammonium halide compound or an organic ammonium halide compound.

The ammonium halide compound or organic ammonium halide compound may comprise one or more compounds represented by the formula $N(R)_4X$, where X is a halide and where R represents a hydrogen or a substituted or unsubstituted carbon chain molecule having 1-20 carbon atoms wherein each R may be the same or different. In an aspect, R is selected from the group consisting of methyl, ethyl, propyl, butyl, and a combination thereof, more specifically methyl. In an aspect, the at least one halide includes chloride and is added to the support by contact with a chloride-containing compound. In another aspect, the at least one halide includes fluoride and is added to the support by contact with a fluoride-containing compound.

Suitable chloride-containing compounds may be ammonium chloride and organic ammonium chloride compounds and may comprise one or more compounds represented by the general formula $N(R)_4Cl$, where R represents a hydrogen or a substituted or unsubstituted carbon chain molecule having from 1 to 20 carbon atoms wherein each R may be the same or different. In an aspect, R is hydrogen, methyl, ethyl, propyl, butyl, or a combination thereof. Alternatively, R is methyl. Examples of organic ammonium chloride compounds suitable for use in the present disclosure include without limitation ammonium chloride ($NH_4Cl$ or AC), tetramethylammonium chloride (TMAC), tetraethylammonium chloride, tetrapropylammonium chloride, tetrabutylammonium chloride, methyltriethylammonium chloride, or a combination thereof.

In some aspects, the fluoride-containing compound may be ammonium fluoride or an organic ammonium fluoride compound and may comprise one or more compounds represented by the general formula $N(R)_4F$, where R represents a hydrogen or a substituted or unsubstituted carbon chain molecule having from 1 to 20 carbon atoms wherein each R may be the same or different. In an aspect, R is hydrogen, methyl, ethyl, propyl, butyl, or a combination thereof. Alternatively, R is methyl. Examples of suitable organic ammonium fluoride compounds include without limitation ammonium fluoride ($NH_4F$ or AF), tetramethylammonium fluoride (TMAF), tetraethylammonium fluoride, tetrapropylammonium fluoride, tetrabutylammonium fluoride, methyltriethylammonium fluoride, or a combination thereof.

In an aspect, the aromatization catalyst (e.g. RP-AC) comprises chloride. In an aspect, chloride is present in the aromatization catalyst (e.g., RP-AC) in an amount of from about 0.1 wt. % to about 5 wt. %, alternatively from about 0.2 wt. % to about 3 wt. %, or alternatively from about 0.3 wt. % to about 2 wt. %, based on the total weight of the aromatization catalyst (e.g., RP-AC).

In various aspects, the aromatization catalyst (e.g. RP-AC) can comprise platinum, and chloride (Cl) in an atomic ratio of Pt:Cl of from about 1.0:0.1 to about 1.0:10, alternatively from about 1.0:0.2 to about 1.0:8.0, or alternatively from about 1.0:0.3 to about 1.0:6.0.

In an aspect, the aromatization catalyst (e.g. RP-AC) can comprise fluoride. In an aspect, fluoride can be present in the aromatization catalyst (e.g. RP-AC) in an amount of from about 0.1 wt. % to about 10 wt. %, alternatively from about 0.2 wt. % to about 5 wt. %, or alternatively from about 0.3 wt. % to about 3 wt. %, based on the total weight of the aromatization catalyst (e.g., RP-AC).

In various aspects, the aromatization catalyst (e.g. RP-AC) can comprise platinum, and fluoride (F) in an atomic ratio of Pt:F of from about 1.0:0.1 to about 1.0:20, alternatively from about 1.0:0.2 to about 1.0:15.0, or alternatively from about 1.0:0.3 to about 1.0:12.0.

In an aspect, a method of preparing an aromatization catalyst (e.g. RP-AC) can comprise the steps of (i) mixing a zeolite (e.g., KL zeolite) with a binder (e.g., silica) and water to form a mixture; (ii) extruding the mixture to form a green extrudate; (iii) drying the green extrudate to form a dried green extrudate; (iv) calcining the dried green extrudate to form a support; (v) washing the support to form a washed support; (vi) drying the washed support to form a dried washed support; (vii) impregnating the dried washed support with a Group 8-10 transition metal compound and at least one halide-containing compound to form a metalized-halided material; and (vii) drying the metalized-halided material to form an aromatization catalyst (e.g., RP-AC). In an aspect, said method has only a single calcination step, namely calcining the dried green extrudate to form a support.

In one aspect, the methodology for preparation of an aromatization catalyst (e.g. RP-AC) comprises mixing a zeolite (e.g., KL zeolite) with water, a binder, and optional extrusion aids to form a mixture. The zeolite and binder (e.g., silica) may be combined to give a weight ratio of from about 95:5 to about 50:50 zeolite:binder; alternatively, from about 90:10 to about 70:30 zeolite:binder; or alternatively from about 88:12 to about 78:22 zeolite:binder in the bound zeolitic support. The amount of water necessary to form an extrudable paste may be determined by any suitable methodology. The amount of water may be sufficient to form a paste having a dough-like consistency. Such a paste may be characterized by a resistance to crumbling (e. g., not brittle) and the ability to maintain a cohesive form (e. g., resists flow). Herein extrusion aids refer to materials that facilitate formation of the green extrudate, typically organic compounds such as cellulose-derived materials (e.g., METHOCEL cellulose ethers), ethylene glycol, stearic acid, and the like, or a combination thereof. The mixture may then be extruded to form a green extrudate.

The mixture of a zeolite, a binder, and water can be formed into a green extrudate having any shape desired for a final product (e.g., aromatization catalyst). Such shapes include for example, cylinders, rings, miniliths, wagon wheels, trilobes, and the like, or a combination thereof. In an aspect, the green extrudate can be extruded as described in U.S. Pat. Nos. 5,558,851; 6,190,539; 6,207,042; 7,902,105; 8,263,518; and 8,461,404; each of which is incorporated by reference herein in its entirety.

The green extrudate may then be dried to form a dried green extrudate. Drying of the green extrudate can be carried out in air or a gas, such as for example nitrogen, hydrogen, oxygen, or any inert gas (e.g., argon), or any compatible a combination thereof. As an example, the green extrudate can be dried in the presence of a gas comprising nitrogen, oxygen, or both, for example enriched air or diluted air, such that it contains from about 0.1 vol. % to about 100 vol. % nitrogen, alternatively from about 0.1 vol. % to about 60 vol. % nitrogen, or alternatively from about 0.1 vol. % to about 30 vol. % nitrogen. In an aspect, the gas is a mixture of air and nitrogen. The air or gas can be circulating, moving, or static. In an aspect, during drying the green extrudate particles can be stationary, or moving, such as for example in a rotary dryer. In an aspect, the green extrudate can be dried (e.g., in air, an inert gas, or mixtures thereof) at a temperature of from about 200° F. (93.3° C.) to about 400° F. (204° C.), alternatively from about 200° F. (93.3° C.) to about 300° F. (149° C.), or alternatively from about 225° F. (107° C.) to about 275° F. (135° C.). Drying pressures may range from about 0.01 mmHg to about 500 psig (3447 KPa), alternatively from about 0.01 mmHg to about 50 psig (345 KPa), alternatively from about 0.01 mmHg to about 5 psig (34.5 KPa), or alternatively at sub-ambient pressure, also referred to as vacuum drying. Drying times may range from equal to or greater than about 1 hour, alternatively from about 1 hour to about 10 hours, or alternatively from about 2 hours to about 5 hours. The resulting material is termed a dried green extrudate.

Hereinafter, the present disclosure will refer to the conditions for drying the green extrudate as "standard drying conditions". It is to be understood the term "standard drying conditions" refer to the ranges of temperature, time, pressures, and all other factors described for the drying of the green extrudate to form a dried green extrudate unless specifically indicated otherwise.

In a further aspect of the presently disclosed methodology, the dried green extrudate may be calcined to form a support. The dried green extrudate may be calcined in the presence of a stationary or flowing gas (e.g., hydrogen, oxygen, air, helium, nitrogen, argon, etc.). For example, the calcination can be carried out in a flowing gas comprising nitrogen and oxygen (for example, air, nitrogen diluted air, or a combination thereof). In an aspect, during calcining, the dried green extrudate particles can be stationary, or moving, such as for example in a rotary calciner. During the calcination step, the temperature can be optionally increased from ambient temperature or the drying temperature to a calcination temperature in a controlled manner, such as through a series of temperature increases followed by temperature hold periods (e.g., stepwise). Calcination temperatures may range of from about 500° F. (260° C.) to about 1500° F. (816° C.), alternatively from about 700° F. (371° C.) to about 1100° F. (593° C.), or alternatively from about 850° F. (454° C.) to about 1100° F. (593° C.). Calcination times may range from about 0.5 to about 5 hours, or alternatively from about 0.5 to about 1.5 hours. In such aspects, the calcination may be carried out in an oxygen-containing atmosphere, alternatively the calcination may be carried out in air, alternatively, the calcination may be carried out in "dry" air. Herein dry air refers to air having a dew point of less than about −40° F. (−40° C.). The resulting material is termed the support. In some aspects of the preparation of an aromatization catalyst (e.g. RP-AC), calcination of the dried green extrudate is the only calcination that occurs prior to utilization of the aromatization catalyst (e.g. RP-AC) of the type disclosed herein.

Hereinafter, the present disclosure refers to the conditions for calcination of the dried green extrudate as "standard calcination conditions." It is to be understood the term "standard calcination conditions" refer to the ranges of temperature, time, pressure, and all other factors described for the calcination of the dried green extrudate to form a support unless specifically indicated otherwise.

In an aspect of the present methodology, the support is washed. Washing the support may reduce the amount of "readily removable" alkali that may be present. The term washing, as used herein, is meant to include any process where a wash liquid (e.g. water) in excess of the material's pore volume is contacted with the support. The "readily removable" alkali is defined herein as the alkali that may be removed from the support by contacting from about 2.0 to about 3.0 ml of wash liquid per gram of the support at ambient temperature. Several washings may be carried out in order to substantially reduce the amount of readily removable alkali. In some aspects, the support may be subjected to at least 1 washing in order to remove a substantial amount of the readily removable alkali. In other aspects, the support may be subjected to at least 3 washings in order to remove a substantial amount of the readily removable alkali. In an aspect, the wash liquid is distilled or deionized water having a pH of from about 5 to about 9. The washing temperature may range from about 70° F. (21° C.) to about 200° F. (93.3° C.), alternatively from about 80° F. (27° C.) to about 130° F. (54° C.), alternatively from about 90° F. (32° C.) to about 110° F. (43° C.). The washing time may range from about 5 minutes to about 60 minutes per wash, alternatively from about 15 minutes to about 30 minutes per wash. The resulting material is termed a washed support.

In an aspect of the presently disclosed methodology, the washed support is then dried using standard drying conditions described previously to form a dried washed support.

In an aspect, the methodology further comprises impregnating the dried washed support with one or more catalytic compounds such as a Group 8-10 transition metal compound (e.g., platinum) and one or more halide-containing compounds. The catalytically active metal may be added to the dried washed support by employing any suitable methodology, e.g., ion-exchange, incipient wetness impregnation, or pore fill impregnation. In an aspect, the catalytically active metal is added to the dried washed support by impregnation with a metal-containing solution. The catalytically active metal in the metal-containing solution may be at least one Group 8-10 transition metal; alternatively, Pt, Pd, Rh, Ir, Ru, Os, or a combination thereof; alternatively, platinum.

In an aspect, the catalytically active metal comprises platinum that is added to the dried washed support via contact with a metal-containing solution containing at least one platinum-containing compound. Examples of suitable platinum-containing compounds for contact with the dried washed support include without limitation platinum compounds that form positively charged platinum complex ions in solution such as for example platinum salts such as chlorides and nitrates; platinum complexes with ammines; or a combination thereof. For example, the platinum-containing compound may be any decomposable platinum-containing compound including, but not limited to, ammonium tetrachloroplatinate, chloroplatinic acid, diammineplatinum (II) nitrite, bis-(ethylenediamine)platinum (II) chloride, platinum (II) acetylacetonate, dichlorodiammine platinum, platinum (II) chloride, tetraammineplatinum (II) hydroxide, tetraammineplatinum chloride, and tetraammineplatinum (II) nitrate. In an aspect, the platinum source is tetraammine platinum chloride (TAPC).

In an aspect, one or more halides are also added to the dried washed support by contact with one or more a halide-containing compounds described previously. The one or more halides may be added into the dried washed support separately; alternatively, the one or more halides may be added to the dried washed support at the same time. Such halides may also be incorporated during addition of a catalytically active metal, alternatively the one or more halides are incorporated in a separate step that may be pre- or post-addition of the catalytically active metal. Halides may be introduced as one or more ammonium halide compounds or organic ammonium halide compounds as described previously. The resulting material is termed a metalized-halided material.

In an aspect, the method further comprises drying the metalized-halided material under the standard drying conditions described previously to form an aromatization catalyst of the type disclosed herein (e.g., an RP-AC). In an aspect, the aromatization catalyst is formed via a methodology wherein only the dried green extrudate is subjected to the standard calcination conditions described previously. In such aspects, the method excludes calcination of any other intermediates formed during preparation of the aromatization catalyst (e.g., RP-AC)

In an aspect, a method for preparing an aromatization catalyst (e.g., RP-AC) of the type disclosed herein comprises (i) mixing a zeolite (e.g., KL zeolite) and a binder with water to form a mixture; (ii) extruding the mixture to form a green extrudate; (iii) drying the green extrudate to form a dried green extrudate; (iv) calcining the dried green extrudate to form a support; (v) washing the support to form a washed support; (vi) drying the washed support to form a dried washed support; (vii) calcining the dried washed support to form a second calcined support; (viii) impregnating the second calcined support with a Group 8-10 transition metal compound and at least one halide-containing compound to form a metalized-halided material; and (ix) drying the metalized-halided material to form an aromatization catalyst (e.g. RP-AC). In an aspect, said method has only two calcination steps, namely calcining the dried green extrudate to form a support and calcining the washed support to form a second calcined support.

In one aspect, the methodology for preparation of an aromatization catalyst (e.g. RP-AC) comprises mixing a zeolite (e.g., KL zeolite) with water, a binder, and optional extrusion aids, all of the type disclosed herein, to form a mixture. The mixture of a zeolite, a binder, and water may subsequently be extruded to form a green extrudate having any shape desired for a final product (e.g., aromatization catalyst) as described herein.

The green extrudate may then be dried using standard drying conditions, as described previously, to form a dried green extrudate. In a further aspect of the presently disclosed methodology, the dried green extrudate may be calcined under standard calcination conditions, as described previously, to form a support.

In an aspect of the present methodology, the support is washed. Washing may occur by contacting from about 2.0 to about 3.0 ml of wash liquid per gram of the support at ambient temperature. Several washings may be carried out, and in some aspects the support may be subjected to at least 1 washing in order to remove a substantial amount of the readily removable alkali. In other aspects, the support may be subjected to at least 3 washings in order to remove a substantial amount of the readily removable alkali. In an aspect, the wash liquid is distilled or deionized water having a pH of from about 5 to about 9. The washing temperature may range from about 70° F. (21° C.) to about 200° F. (93.3° C.), alternatively of from about 80° F. (27° C.) to about 130° F. (54° C.), alternatively from about 90° F. (32° C.) to about 110° F. (43° C.). The washing time may range from about 5 to about 60 minutes per wash, alternatively from about 15 to about 30 minutes per wash. The resulting material is termed a washed support.

In an aspect, the washed support is dried under standard drying conditions described previously to form a dried washed support. In an aspect of the present methodology, the dried washed support is calcined under standard calcination conditions to form a second calcined support (e.g., temperature is ramped or stepped up from drying temperature to calcining temperature).

The methodology further comprises impregnating the second calcined support with one or more catalytic compounds such as a Group 8-10 transition metal compound (e.g., platinum) and one or more halide-containing compounds. The catalytically active metal may be added to the second calcined support by employing any suitable methodology, e.g., ion-exchange, incipient wetness impregnation, or pore fill impregnation. In an aspect, the catalytically active metal is added to the second calcined support by impregnation with a metal-containing solution. The catalytically active metal in the metal-containing solution may be at least one Group 8-10 transition VIII metal; alternatively, Pt, Pd, Rh, Ir, Ru, Os, or a combination thereof; alternatively, platinum.

In an aspect, the catalytically active metal comprises platinum that is added to the second calcined support via contact with a metal-containing solution containing at least one platinum-containing compound described earlier (e.g., TAPC). In an aspect, one or more halides are also added to the second calcined support by contact with a solution containing one or more halide-containing compounds as described previously. The one or more halides may be added into the second calcined support separately; alternatively, the one or more halides may be added to the second calcined support at the same time. Such halides may also be incorporated during addition of a catalytically active metal, alternatively the one or more halides are incorporated in a separate step that may be pre- or post-addition of the catalytically active metal. Examples of suitable halides include without limitation fluoride, chloride, bromide, iodide, or a combination thereof. Such halides may be introduced as one or more ammonium halide compounds or organic ammonium halide compounds as described previously. The resulting material is termed a metalized-halided material.

In an aspect, the methodology further comprises drying the metalized-halided material under the standard drying conditions described previously to form an aromatization catalyst of the type disclosed herein (e.g., an RP-AC). In an aspect, the aromatization catalyst (e.g. RP-AC) is formed via a methodology wherein only the dried green extrudate and the dried washed support are subjected to the standard calcination conditions described previously. In such aspects, the method excludes calcination of any other intermediates formed during preparation of the aromatization catalyst (e.g., RP-AC).

In an aspect, a method for preparing an aromatization catalyst (e.g., RP-AC) of the type disclosed herein comprises (i) mixing the zeolite and a binder with water to form a mixture; (ii) extruding the mixture to form a green extrudate; (iii) drying the green extrudate to form a dried green extrudate; (iv) calcining the dried green extrudate to form a support; (v) washing the support to form a washed support; (vi) drying the washed support to form a dried washed support; (vii) impregnating the dried washed support with a Group 8-10 transition metal compound and at least one halide-containing compound to form a metalized-halided material; (viii) drying the metalized-halided material to form a dried metalized-halided material and (ix) calcining the dried metalized-halided material to form an aromatization catalyst (e.g. RP-AC) of the type disclosed herein. In an aspect, said method has only two calcination steps, namely calcining the dried green extrudate to form a support and calcining the dried metalized-halided material to form an aromatization catalyst (e.g. RP-AC).

In one aspect, the methodology for preparation of an aromatization catalyst (e.g., RP-AC) comprises mixing a zeolite (e.g., KL zeolite) with water, a binder, and optional extrusion aids, all of the type disclosed herein, to form a mixture. The mixture of a zeolite, a binder, and water may subsequently be extruded to form a green extrudate having any shape desired for a final product (e.g., aromatization catalyst) as described herein.

The green extrudate may then be dried to form a dried green extrudate. Drying of the green extrudate can be carried out under the previously described standard drying conditions. In a further aspect of the presently disclosed methodology, the dried green extrudate may be calcined under the previously described standard calcination conditions form a support (e.g., temperature is ramped or stepped up from drying temperature to calcining temperature).

In an aspect of the present methodology, the support is washed. Washing may occur by contacting from about 2.0 to about 3.0 ml of wash liquid per gram of the support at ambient temperature. Several washings may be carried out, and in some aspects the support may be subjected to at least 1 washing in order to remove a substantial amount of the readily removable alkali. In other aspects, the support may be subjected to at least 3 washings in order to remove a substantial amount of the readily removable alkali. In an aspect, the wash liquid is distilled or deionized water having a pH of from about 5 to about 9. The washing temperature may range from about 70° F. (21° C.) to about 200° F. (93.3° C.), alternatively of from about 80° F. (27° C.) to about 130° F. (54° C.), alternatively from about 90° F. (32° C.) to about 110° F. (43° C.). The washing time may range from about 5 to about 60 minutes per wash, alternatively from about 15 to about 30 minutes per wash. The resulting material is termed a washed support. In an aspect, the washed support is dried under the standard drying conditions described previously to form a dried washed support.

In an aspect of the present methodology, the dried washed support is impregnated with one or more catalytic compounds such as a Group 8-10 transition metal compound and one or more halides as halide-containing compounds. The catalytically active metal may be added to the dried washed support by employing any suitable methodology, e.g., ion-exchange, incipient wetness impregnation, or pore fill impregnation. The catalytically active metal in the metal-containing solution may be at least one Group 8-10 transition VIII metal; alternatively, Pt, Pd, Rh, Ir, Ru, Os, or a combination thereof. In an aspect, the catalytically active metal comprises platinum that is added to the dried washed support via contact with a metal-containing solution containing at least one platinum-containing compound (e.g., TAPC). In an aspect, one or more halides are also added to the dried washed support by contact with a solution containing one or more halide-containing compounds. The one or more halides may be added into the dried washed support separately; alternatively, the one or more halides may be added to the dried washed support at the same time. Such halides may also be incorporated during addition of a catalytically active metal, alternatively the one or more halides are incorporated in a separate step that may be pre- or post-addition of the catalytically active metal. Examples of suitable halides include without limitation fluoride, chloride, bromide, iodide, or a combination thereof. Such halides may be introduced as one or more ammonium halide compounds or organic ammonium halide compounds as described previously. The resulting material is termed a metalized-halided material.

In an aspect, the methodology further comprises drying the metalized-halided material under the standard drying conditions described previously to form a dried metalized-halided material.

In an aspect the methodology further comprises calcining the dried metalized-halided material under the standard calcination conditions described previously to form an aromatization catalyst (e.g., RP-AC). In an aspect, the aromatization catalyst is formed via a methodology wherein only the dried green extrudate and the dried metalized-halided material are subjected to standard calcination conditions. In such aspects, the method excludes calcination of any other intermediates formed during preparation of the aromatization catalyst (e.g. RP-AC) of the type disclosed herein.

In an aspect, an aromatization catalyst is conventionally prepared via a process wherein (i) a zeolite, binder, and optional extrusion aids are contacted with water to form a mixture; (ii) the mixture is extruded to form a green extrudate; (iii) the green extrudate is dried to form a dried green extrudate; (iv) the dried green extrudate is calcined to form a calcined extruded base; (v) the calcined extruded base is washed to form a washed calcined extruded based; (vi) the washed calcined extruded base is dried to form a dried calcined extruded base; (vii) the dried calcined extruded base is calcined to form a twice-calcined base; (viii) the twice-calcined base is impregnated with a Group 8-10 transition metal and one or more halides to form a metalized-halided material; (ix) the metalized-halided material is dried to form a dried metalized-halided material; and (x) the dried metalized-halided material is calcined to form a conventional aromatization catalyst. In such aspects, the methodology for formation of the conventional aromatization catalyst comprises at least three calcination steps carried out under standard calcination conditions, namely calcination of at least the dried green extrudate, the dried calcined extruded base, and the dried metalized-halided material. This process is depicted schematically in FIG. 1.

In an aspect, the aromatization catalyst prepared as disclosed herein (e.g., RP-AC) is used as a catalyst in an aromatization reactor system comprising at least one aromatization reactor and its corresponding processing equipment. As used herein, the terms "aromatization," "aromatizing" and "reforming" refer to the treatment of a hydrocarbon feed to provide an aromatics enriched product, which in one aspect is a product whose aromatics content is greater than that of the feed. Typically, one or more components of the feed undergo one or more reforming reactions to produce aromatics. Some of the hydrocarbon reactions that occur during the aromatization operation include the dehydrogenation of cyclohexanes to aromatics, dehydroisomerization of alkylcyclopentanes to aromatics, dehydrocyclization of acyclic hydrocarbons to aromatics, or a combination thereof. A number of other reactions also occur, including the dealkylation of alkylbenzenes, isomerization of paraffins, hydrocracking reactions that produce light gaseous hydrocarbons, e.g., methane, ethane, propane and butane, or a combination thereof.

The aromatization reaction occurs under process conditions that thermodynamically favor the dehydrocyclization reaction and limit undesirable hydrocracking reactions. The pressures may be from about 0 pounds per square inch gauge (psig) (0 kPa) to about 500 psig (3447 kPa), or alternatively from about 25 psig (172 kPa) to about 300 psig (2068 kPa). The molar ratio of hydrogen to hydrocarbons may be from about 0.1:1 to about 20:1, alternatively from about 1:1 to about 6:1. The operating temperatures include reactor inlet temperatures from about 700° F. (371° C.) to about 1050° F. (566° C.), or alternatively from about 900° F. (482° C.) to about 1000° F. (538° C.). The liquid hourly space velocity for the hydrocarbon feed over the aromatization catalyst may be from about 0.1 hr$^{-1}$ to about 10 hr$^{-1}$, or alternatively from about 0.5 hr$^{-1}$ to about 2.5 hr$^{-1}$.

The composition of the feed is a consideration when designing aromatization catalyst systems. In an aspect, the hydrocarbon feed comprises non-aromatic hydrocarbons containing at least six carbon atoms. The feed to the aromatization system is a mixture of hydrocarbons comprising $C_6$ to $C_8$ hydrocarbons containing up to about 10 wt % and alternatively up to about 15 wt % of $C_5$ and lighter hydrocarbons ($C_5^-$) and containing up to about 10 wt % of $C_9$ and heavier hydrocarbons ($C_9^+$). Such low levels of $C_9+$ and $C_5^-$ hydrocarbons maximize the yield of high value aromatics. In some aspects, an optimal hydrocarbon feed maximizes the percentage of $C_6$ hydrocarbons. Such a feed may be achieved by separating a hydrocarbon feed such as a full range naphtha into a light hydrocarbon feed fraction and a heavy hydrocarbon feed fraction, and using the light fraction.

In another aspect, the feed is a naphtha feed. The naphtha feed may be a light hydrocarbon feed, with a boiling range of about 70° F. (21° C.) to about 450° F. (232° C.). The naphtha feed may contain aliphatic, naphthenic, or paraffinic hydrocarbons. These aliphatic and naphthenic hydrocarbons are converted, at least in part, to aromatics in the aromatization reactor system. While catalytic aromatization typically refers to the conversion of naphtha, other feedstocks may be treated as well to provide an aromatics enriched product. Therefore, while the conversion of naphtha is one aspect, the present disclosure may be useful for producing aromatization catalysts for the aromatization of a variety of feedstocks such as paraffinic hydrocarbons, olefinic hydrocarbons, acetylenic hydrocarbons, cyclic paraffin hydrocarbons, cyclic olefin hydrocarbons, and mixtures thereof, and particularly saturated hydrocarbons.

In an aspect, the feedstock is substantially free of sulfur, nitrogen, metals, and other known poisons for aromatization catalysts. In an aspect, the feedstock contains less than about 100 ppb of sulfur. If present, such poisons may be removed using any suitable methodology. In some aspects, the feed may be purified by first using conventional hydrofining techniques, then using sorbents to remove the remaining poisons.

EXAMPLES

The disclosure having been generally described, the following examples are given as particular aspects of the disclosure and to demonstrate the practice and advantages thereof. It is understood that the examples are given by way of illustration and are not intended to limit the specification of the claims to follow in any manner.

Surface areas were determined using the Brunauer, Emmett, and Teller ("BET"), described in Brunauer, Stephen; Emmett, P. H.; Teller, Edward (1938). "Adsorption of Gases in Multimolecular Layers". Journal of the American Chemical Society. 60 (2): 309-319. doi:10.1021/ja01269a023, which is incorporated herein by reference in its entirety. Micropore volumes were determined using the t-plot method using the thickness equation of Harkins and Jura. The t-plot method is described by Lippens and de Boer in Lippens B. C., and de Boer J. H., (1965), J. Catal. 4, 319; and De Boer J. H. Lippens B. C., Linsen B. G., Broeckhoff J. C. P., van den Heuvel A., and Onsinga T. V., (1966), J. Colloid Interf. Sci. 21, 405, each of which is incorporated herein by reference in its entirety. The thickness equation of Harkins and Jura is published in the Journal of the American Chemical Society, 66, 1366 (1944) which is incorporated herein by reference in its entirety. As used herein micropores are defined as pores having pore diameters less than 2 nm, mesopores are defined as having pore diameters between 2 and 50 nm, and macropores are defined as pores having pore diameters greater than 50 nm. Platinum dispersion was determined by CO chemisorption. Crush strength was determined in accordance with ASTM method D 6175-98.

In each of the examples, the following standard testing procedures were utilized. The catalysts were ground and sieved to about 25-45 mesh, and 0.69 g of the sieved catalyst was placed in a ⅜-inch OD stainless steel reactor vessel in a temperature controlled furnace. After reducing the catalyst under flowing molecular hydrogen, a feed stream of aliphatic hydrocarbons and molecular hydrogen was introduced to the reactor vessel at a feed rate of 12 mL/h, a pressure of 100 psig (690 KPa), a $H_2$:hydrocarbon molar ratio of 1:1.3, and a liquid hourly space velocity (LHSV) of 12 hr$^{-1}$ to obtain catalyst performance data over time. The hydrocarbon feed contained from 22 to 26 wt. % n-hexane, 4 to 8 wt. % n-heptane, 33 to 37 wt. % $C_6$ iso-paraffins, 15 to 21 wt. % $C_7$ iso-paraffins, 6 to 10 wt. % $C_8$ iso-paraffins, with the balance attributable to $C_6$ and $C_7$ olefins, naphthenes, and aromatics. The reactor effluent composition was analyzed by gas chromatography to determine the amount of benzene and toluene.

15-25 parts by weight of a silica binder was added to 100 parts by weight of an L-type zeolite followed by kneading and molding. Afterward, the thus molded sample was calcined at 475-525° C. for approximately 1 hour in air to obtain a molded L-type zeolite with a silica binder. Next, the molded L-type zeolite with silica binder was washed multiple times with deionized water at approximately a 2.5:1 volumetric ratio of water to molded L-type zeolite with silica binder. After washing, the material was dried in air at 110-130 C for 4 hours. The dried material was then calcined in air at 475-525 C for 1 hour. Tetraamine platinum chloride, ammonium fluoride, and ammonium chloride were then dissolved in deionized water in concentrations to give final catalyst Pt loadings of 0.95-1.05 wt %, Cl loadings of 0.6-1.0 wt %, and F loadings of 0.6-0.9 wt %. The washed and calcined molded L-type zeolite with silica binder was then impregnated with this solution. After impregnation, the material was dried under vacuum at approximately 40 torr and temperatures up to 100 C. Lastly, after vacuum drying, the catalyst was calcined in air at 250-300 C for approximately 1 hour.

Example 1

Figure 2:
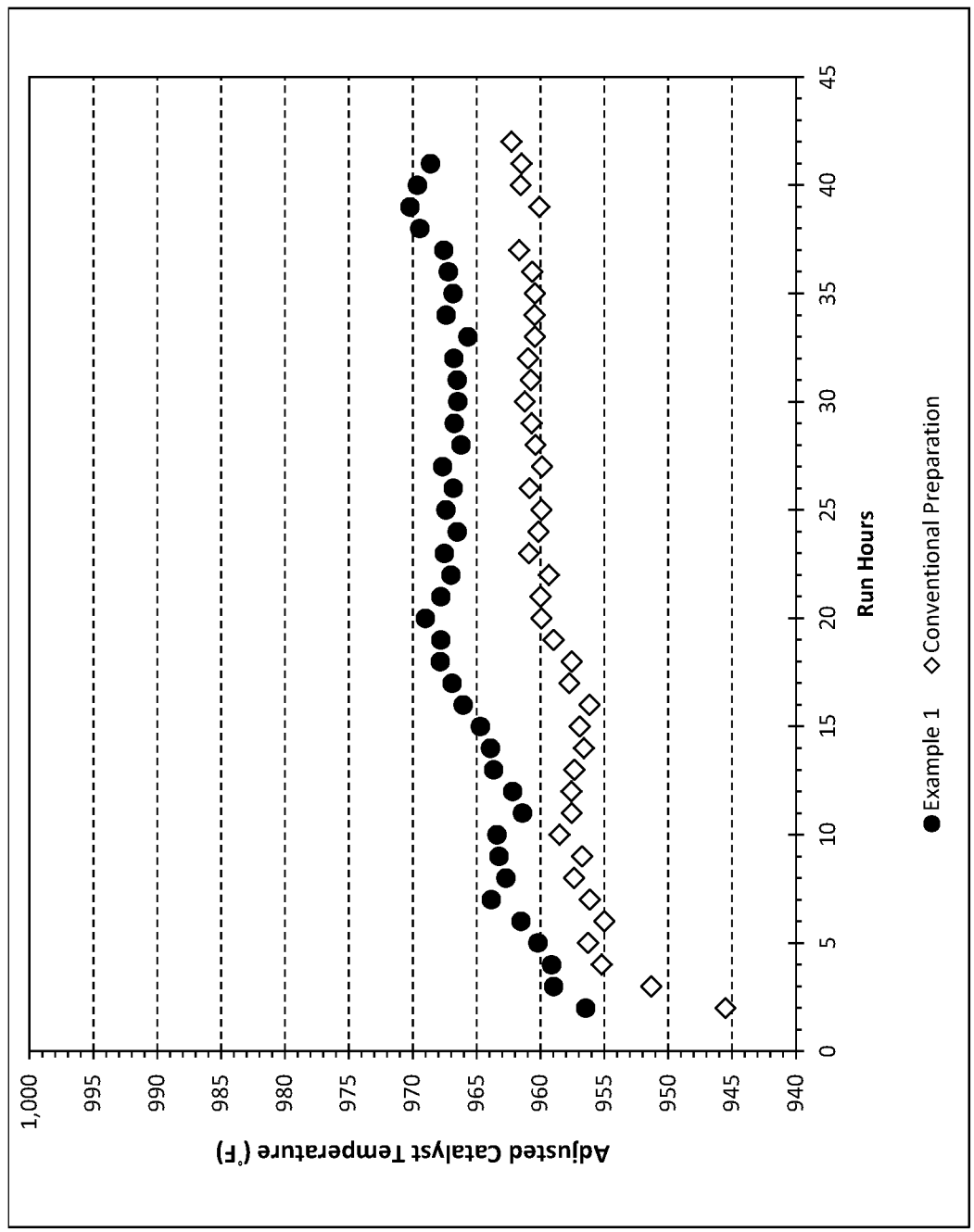
FIG. 2 depicts the adjusted catalyst temperature as a function of run hours for the samples of Example 1.
Figure 3:
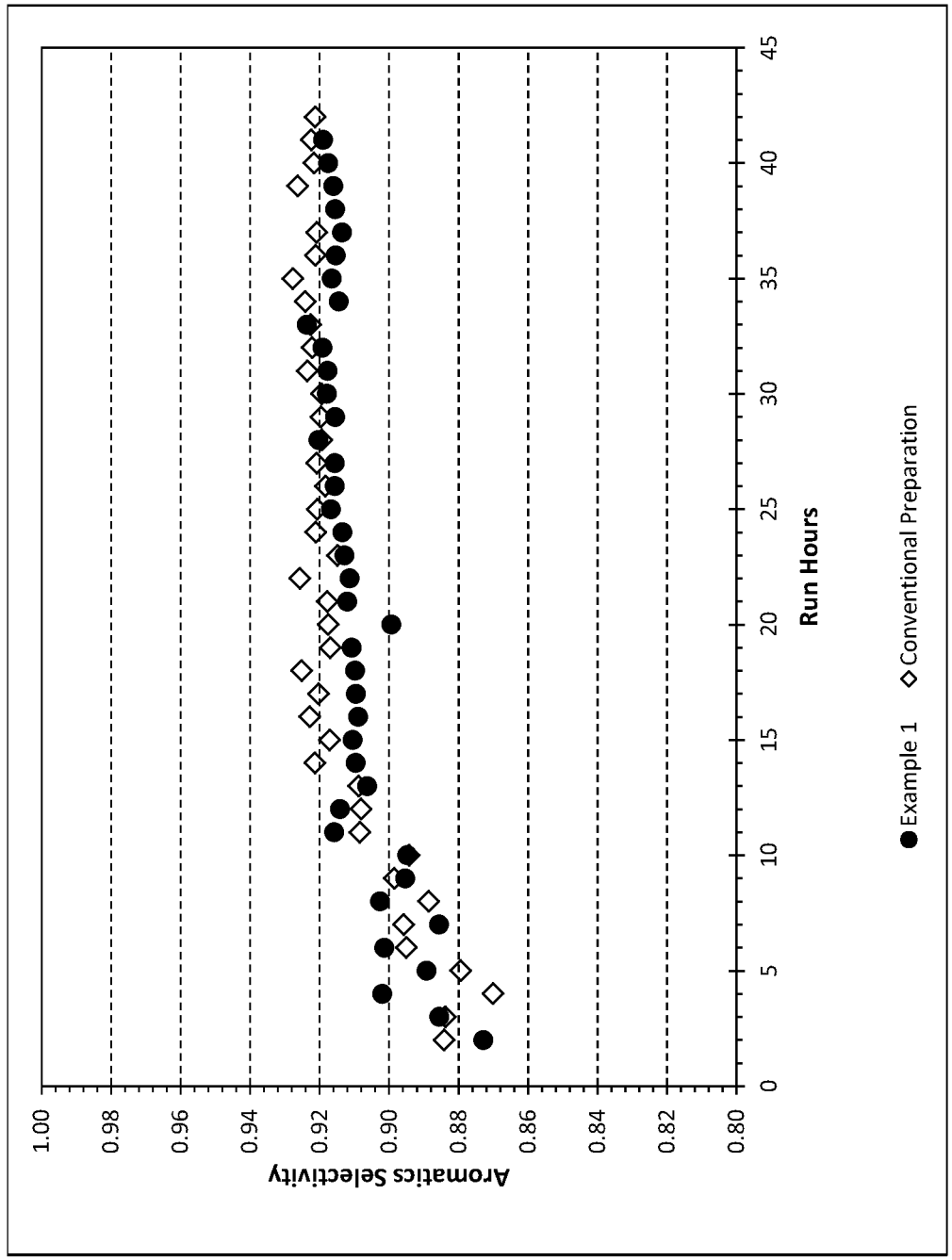
FIG. 3 depicts the aromatics selectivity as a function of run hours for the samples of Example 1.

An aromatization catalyst (e.g., RP-AC) was prepared according to the Conventional Example, however with only two calcinations. One calcination occurred after drying of the green extrudate and another after washing and drying. The calcination after the impregnation with the platinum-containing compound and the at least one halide-containing compounds was not performed. The catalytic activity of the RP-AC was compared to a catalyst prepared conventionally (e.g., according to FIG. 1). Specifically, a comparison of the adjusted catalyst temperature and aromatics selectivity is presented in FIGS. 2 and 3, respectively. The results demonstrate the catalyst subject to 2 calcination steps (e.g., an RP-AC) had activity and selectively comparable to the conventional aromatization catalyst.

Example 2

Figure 4:
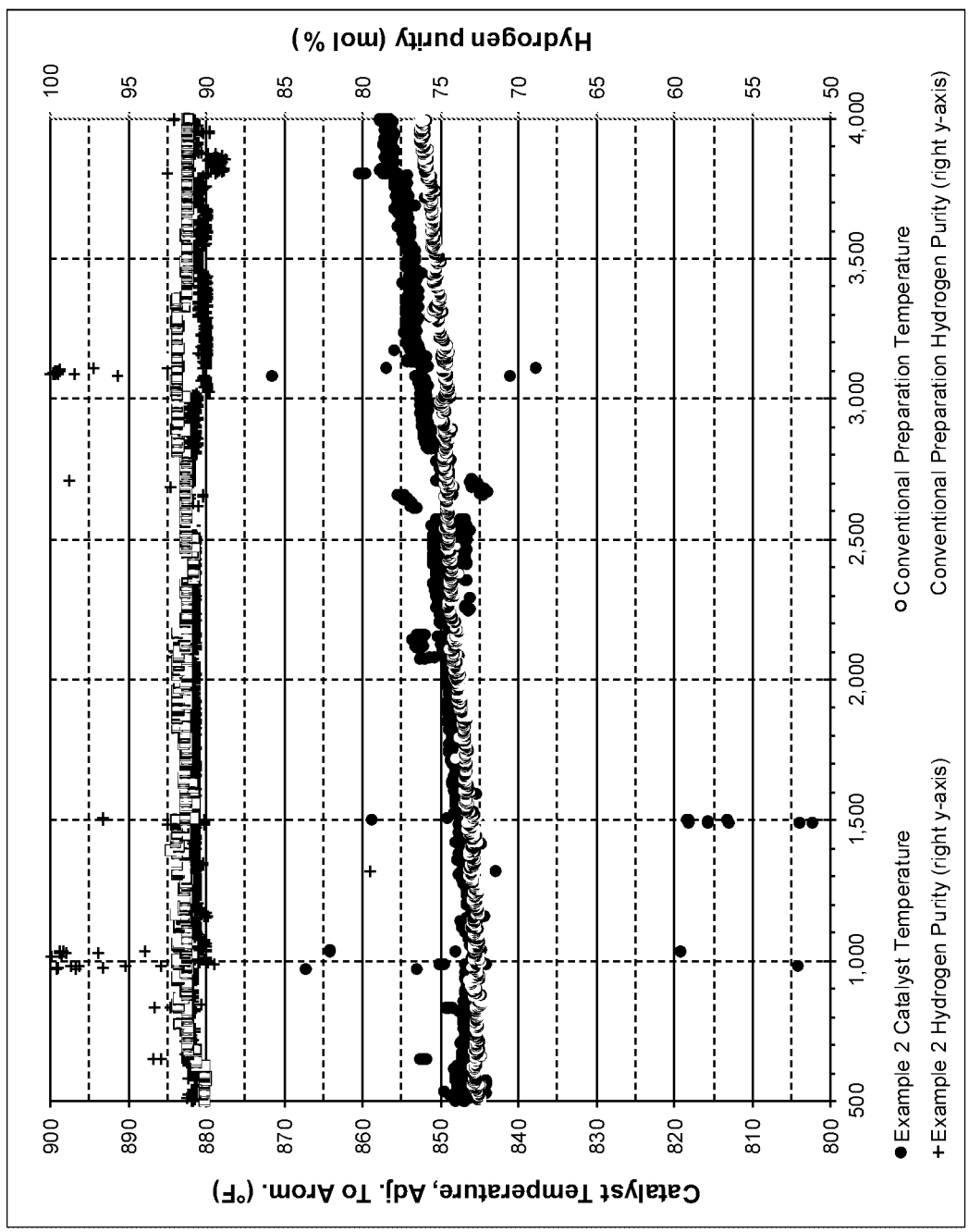
FIG. 4 depicts the catalyst adjusted temperature as a function of time on stream for the samples of Example 2.

An aromatization catalyst (e.g., RP-AC) was prepared according to the Conventional Example, however with two calcinations and forgoing the calcination of the dried washed support. The method entailed i) mixing a zeolite with water to form a mixture; (ii) extruding the mixture to form a green extrudate; (iii) drying the green extrudate to form a dried green extrudate; (iv) calcining the dried green extrudate to form a support; (v) washing the support to form a washed support; (vi) drying the washed support to form a dried washed support; (vii) impregnating the dried washed support with a Group 8-10 transition metal compound and at least one halide-containing compound to form a metalized-halided material; (viii) drying the metalized-halided material to form a dried metalized-halided material and (ix) calcining the dried metalized-halided material to form an aromatization catalyst. Consequently, unlike the conventional preparation, the dried washed support was not calcined. This corresponds to method #3 as described above. In this example, various structural characteristics of the aromatization catalyst (e.g., RP-AC) and the catalytic activity of this material was compared to that of an aromatization catalyst prepared as schematized in FIG. 1. The results are presented in Table 1 and FIG. 4, respectively.

TABLE 1

| Property | RP-AC | Conventional |
| --- | --- | --- |
| Catalyst Micropore Vol (cc/g) | 0.057 | 0.062 |
| Catalyst % Pt dispersion | 63 | 65 |
| Catalyst BET Surface Area* ($m^2/g$) | 188 | 178 |
| WCEB Crush Strength (lbs) | 8.4 | 8.1 |

*BET = Brunauer-Emmett-Teller method of determining surface area

The results of Table 1 demonstrate the RP-AC had structural features similar to those of a conventional aromatization catalyst. Further, the performance testing results shown in FIG. 4 demonstrate that the RP-AC had catalytic activity, as measured by the reaction temperature needed to produce a defined amount of aromatics, equivalent to that of the conventional aromatization catalyst. Additionally, the RP-AC catalyst showed equivalent selectivity to the conventional aromatization catalyst as measured by $H_2$ purity. This parameter can be used to measure catalyst selectivity as the less selective a catalyst is, the more light hydrocarbons are generated through cracking of the naphtha feed. These light species end up in the $H_2$ thus lowering the purity. The catalyst selectivity can be represented by its liquid yield (C5+), aromatics selectivity and or $H_2$ purity. The fact the uncalcined catalyst showed equivalent $H_2$ purity than the standards means, the calcination removal does not affect the selectivity of the catalyst.

Example 3

Figure 5:
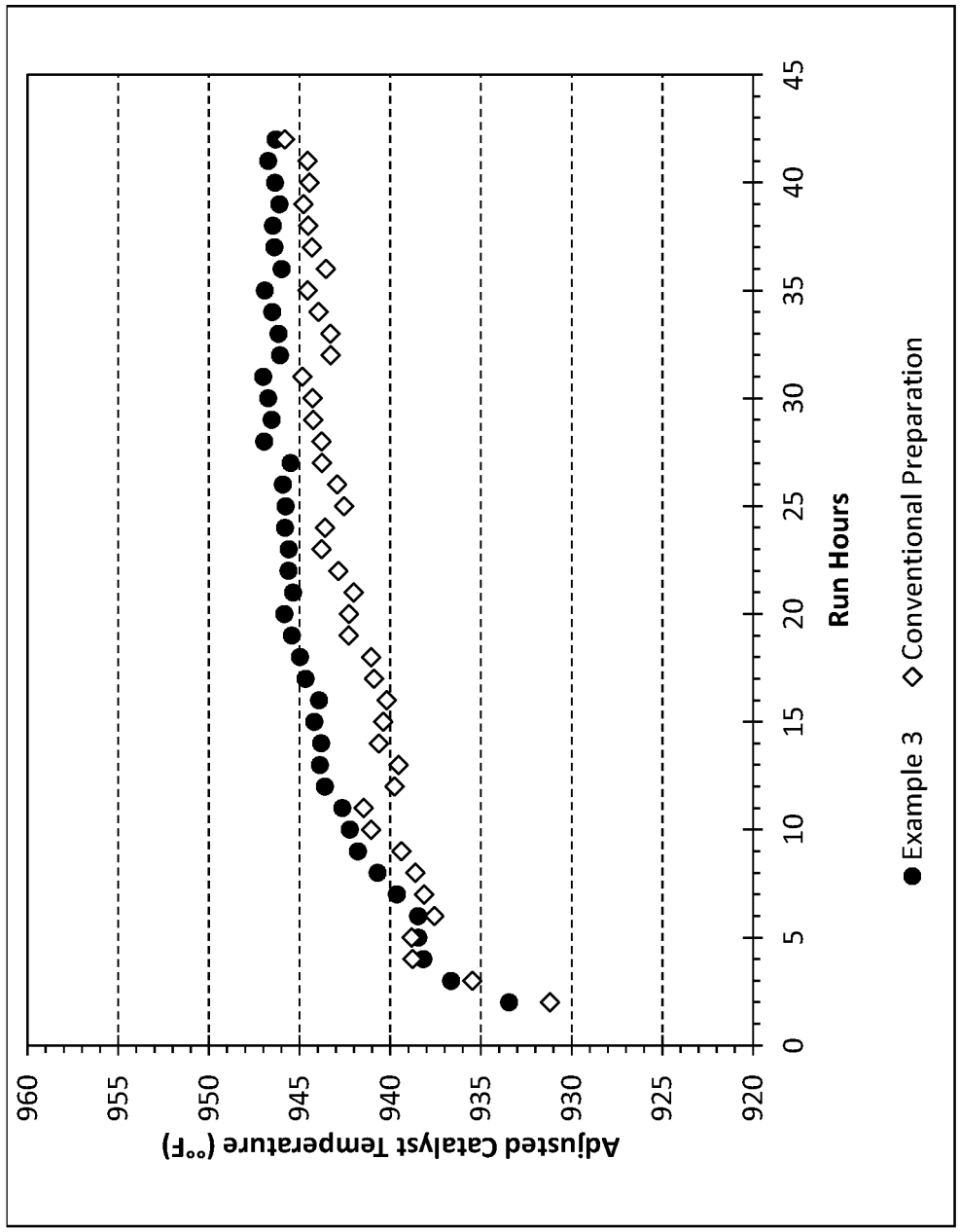
FIG. 5 depicts the catalyst adjusted temperature as a function of time on stream for the samples of Example 3.
Figure 6:
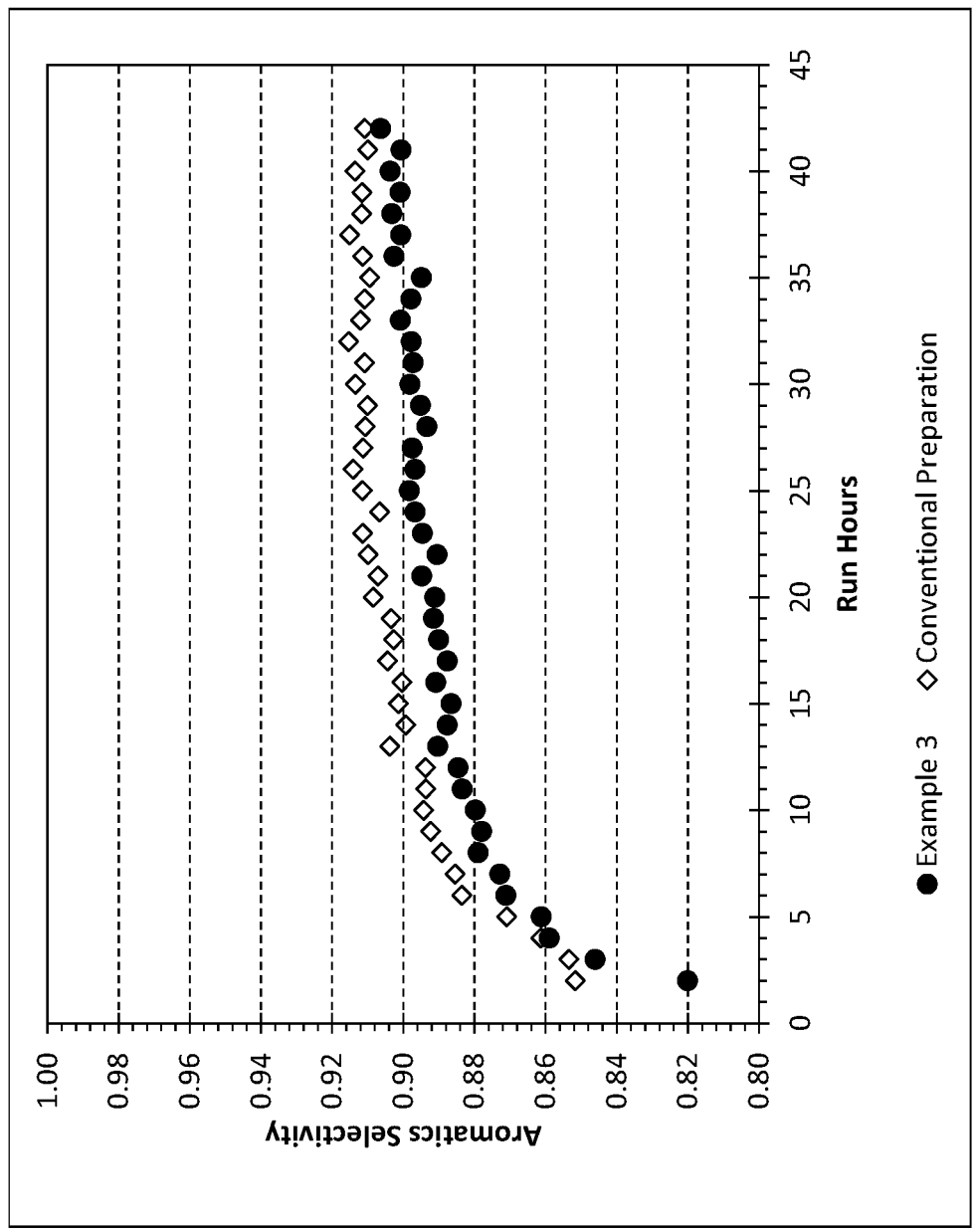
FIG. 6 depicts the aromatics selectivity as a function of run hours for the samples of Example 3.

An aromatization catalyst (e.g., RP-AC) was prepared according to the Conventional Example, however with only one calcination and forgoing the calcination of the dried washed support and the calcination of the dried metalized-halided material. The method entailed i) mixing a zeolite with water to form a mixture; (ii) extruding the mixture to form a green extrudate; (iii) drying the green extrudate to form a dried green extrudate; (iv) calcining the dried green extrudate to form a support; (v) washing the support to form a washed support; (vi) drying the washed support to form a dried washed support; (vii) impregnating the dried washed support with a Group 8-10 transition metal compound and at least one halide-containing compound to form a metalized-halided material and (viii) drying the metalized-halided material to form a dried metalized-halided material. Consequently, unlike conventional preparations, the dried washed support and the dried metalized-halided material was not calcined. This corresponds to method #1 as described above. RP-AC properties can be seen in Table 2. The results of Table 2 demonstrate the RP-AC had structural features similar to those of a conventional aromatization catalyst. Further, the performance testing results shown in FIGS. 5 and 6 demonstrate that the RP-AC had catalytic activity and selectivity equivalent to that of the conventional aromatization catalyst.

TABLE 2

| Property | RP-AC Value |
| --- | --- |
| N wt % | 0.66 |
| Micropore Volume (cc/g) | 0.050 |
| BET Surface Area ($m^2/g$) | 176 |
| Catalyst % Pt Dispersion | 60 |
| F wt % | 0.810 |
| Cl wt % | 0.830 |

Additional Aspects

The following enumerated aspects are provided as non-limiting examples:

A first aspect which is a process of making an aromatization catalyst comprising (a) mixing a zeolite, a binder, and water to form a mixture; (b) extruding the mixture to form a green extrudate; (c) drying the green extrudate to form a dried green extrudate; (d) calcining the dried green extrudate to form a support, wherein calcining the dried green extrudate is the only calcination step in the process; (e) washing the support to form a washed support; (f) drying the washed support to form a dried washed support; (g) impregnating the dried washed support with a Group 8-10 transition metal compound and at least one halide-containing compound to form a metalized-halided material; and (h) vacuum drying the metalized-halided material to form a dried metalized-halided material which is the aromatization catalyst.

A second aspect which is the process of the first aspect further comprising (f-1) not calcining the dried washed support to form a second calcined support; and (i) not calcining the dried metalized-halided material to form the aromatization catalyst.

A third aspect which is the process of any of the first through second aspects wherein the zeolite comprises an L-zeolite.

A fourth aspect which is the process of any of the first through third aspects wherein the Group 8-10 transition metal comprises platinum.

A fifth aspect which is the process of any of the first through fourth aspects wherein the Group 8-10 transition metal compound comprises ammonium tetrachloroplatinate, diammineplatinum (II) nitrite, bis-(ethylenediamine)platinum (II) chloride, dichlorodiammine platinum, tetraammineplatinum (II) hydroxide, tetraammineplatinum chloride, tetraammineplatinum (II) nitrate, or a combination thereof.

A sixth aspect which is the process of any of the first through fifth aspects wherein the at least one halide comprises a fluoride-containing compound, a chloride-containing compound, or a combination thereof.

A seventh aspect which is the process of any of the first through sixth aspects wherein the aromatization catalyst comprises the Group 8-10 transition metal in an amount of from about 0.1 wt. % to about 5 wt. % based on the total weight of the aromatization catalyst.

An eighth aspect which is the process of any of the first through seventh aspects wherein the aromatization catalyst has a micropore volume of from about 0.04 cc/g to about 0.10 cc/g.

A ninth aspect which is the process of any of the first through eighth aspects wherein the aromatization catalyst has a crush strength of from about 4.5 lbs. (2.0 Kg) to about 15 lbs. (6.8 Kg).

A tenth aspect which is the process of any of the first through ninth aspects further comprising contacting the aromatization catalyst with a hydrocarbon feed under conditions suitable for conversion of the hydrocarbons to aromatics.

An eleventh aspect which is a process of making an aromatization catalyst comprising: (a) mixing a zeolite, a binder, and water to form a mixture; (b) extruding the mixture to form a green extrudate; (c) drying the green extrudate to form a dried green extrudate; (d) calcining the dried green extrudate to form a support, wherein calcining the dried green extrudate is the first of only two calcination steps in the process; (e) washing the support to form a washed support; (f) drying the washed support to form a dried washed support; (g) calcining the dried washed support to form a second calcined support, wherein calcining the dried washed support is the second of only two calcination steps in the process; (h) impregnating the second calcined support with a Group 8-10 transition metal compound and at least one halide-containing compound to form a metalized-halided material; and (i) vacuum drying the metalized-halided material to form a dried metalized-halided material which is the aromatization catalyst.

A twelfth aspect which is the process of the eleventh aspect further comprising (j) not calcining the dried metalized-halided material to form the aromatization catalyst.

A thirteenth aspect which is the process of any of the eleventh through twelfth aspects wherein the zeolite comprises an L-zeolite.

A fourteenth aspect which is the process of any of the eleventh through thirteenth aspects wherein the Group 8-10 transition metal comprises platinum.

A fifteenth aspect which is the process of any of the eleventh through fourteenth aspects wherein the at least one halide comprises a fluoride-containing compound, a chloride-containing compound, or a combination thereof.

A sixteenth aspect which is the process of any of the eleventh through fifteenth aspects further comprising contacting the aromatization catalyst with a hydrocarbon feed under conditions suitable for conversion of the hydrocarbons to aromatics.

A seventeenth aspect which is a process of making an aromatization catalyst, the process comprising (a) mixing a zeolite, a binder, and water to form a mixture; (h) extruding the mixture to form a green extrudate;(c) drying the green extrudate to form a dried green extrudate; (d) calcining the dried green extrudate to form a support, wherein calcining the dried green extrudate is the first of only two calcination steps in the process; (e) washing the support to from a washed support; (f) drying the washed support to form a dried washed support; (g) impregnating the dried washed support with a Group 8-10 transition metal compound and at least one halide-containing compound to form a metalized-halided material; (h) vacuum_drying the metalized-halided material to form a dried metalized-halided material; and (i) calcining the dried metalized-halided material to form an aromatization catalyst, wherein calcining the dried metalized-halided material is the second of only two calcination steps in the process.

An eighteenth aspect which is the process of seventeenth aspect further comprising (f-1) not calcining the dried washed support to form a calcined washed support.

A nineteenth aspect which is the process of any of the seventeenth through eighteenth aspects wherein the zeolite comprises an L-zeolite, the Group 8-10 transition metal comprises platinum, and the at least one halide comprises a fluoride-containing compound, a chloride-containing compound, or a combination thereof.

A twentieth aspect which is the process of any of the seventeenth through nineteenth aspects further comprising contacting the aromatization catalyst with a hydrocarbon feed under conditions suitable for conversion of the hydrocarbons to aromatics.

A twenty-first aspect which is a process of making an aromatization catalyst, the process comprising (a) mixing a zeolite, a binder, and water to form a mixture; (b) extruding the mixture to form a green extrudate; (c) drying the green extrudate to form a dried green extrudate; (d) calcining the dried green extrudate to from a support; and (c) impregnating the support with a Group 8-10 transition metal compound and at least one halide-containing compound to form the aromatization catalyst, and wherein the process further consists of no more than one calcination steps at a temperature in excess of about 500° F. (260° C.), alternatively about 700° F. (371° C.), alternatively about 850° F. (454° C.).

A twenty-second process of making an aromatization catalyst comprising zeolite, platinum, and fluoride, wherein the process consists of no more than one or two calcination steps at a temperature in excess of about 500° F. (260° C.), alternatively about 700° F. (371° C.), alternatively about 850° F. (454° C.).

A twenty-third process which is an aspect of the first process excluding the step of calcining the washed support to form a second calcined support, excluding the step of calcining the dried metalized-halided material to form the aromatization catalyst, or excluding both the step of calcining the washed support to form a second calcined support and the step of calcining the dried metalized-halided material to form the aromatization catalyst.

A twenty-fourth aspect which is the process of the eleventh aspect further comprising excluding the step of calcining the dried metalized-halided material to form the aromatization catalyst.

A twenty-fifth aspect which is the process of the seventeenth aspect further comprising excluding the step of calcining the dried washed support to form a calcined washed support.

While aspects of the invention have been shown and described, modifications thereof can be made by one skilled in the art without departing from the spirit and teachings of the invention. The aspects described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the aspects of the present invention. The disclosures of all patents, patent applications, and publications cited herein are hereby incorporated by reference, to the extent that they provide exemplary, procedural, or other details supplementary to those set forth herein.

What is claimed is:

1. A process comprising:
   (a) mixing an L-zeolite, a binder, and water to form a mixture;
   (b) extruding the mixture to form a green extrudate;
   (c) drying the green extrudate to form a dried green extrudate;
   (d) calcining the dried green extrudate to form a support, wherein calcining the dried green extrudate is the only calcination step in the process;
   (e) washing the support to form a washed support;
   (f) drying the washed support to form a dried washed support;
   (g) impregnating the dried washed support with a Group 8-10 transition metal compound and at least one halide-containing compound to form a metalized-halided material; and
   (h) vacuum drying the metalized-halided material to form a dried metalized-halided material which is an aromatization catalyst.

2. The process of claim 1 wherein the Group 8-10 transition metal comprises platinum.

3. The process of claim 1 wherein the Group 8-10 transition metal compound comprises ammonium tetrachloroplatinate, diammineplatinum (II) nitrite, bis-(ethylenediamine)platinum (II) chloride, dichlorodiammine platinum, tetraammineplatinum (II) hydroxide, tetraammineplatinum chloride, tetraammineplatinum (II) nitrate, or a combination thereof.

4. The process of claim 1 wherein the at least one halide comprises a fluoride-containing compound, a chloride-containing compound, or a combination thereof.

5. The process of claim 1 wherein the aromatization catalyst comprises the Group 8-10 transition metal in an amount of from about 0.1 wt. % to about 5 wt. % based on the total weight of the aromatization catalyst.

6. The process of claim 1 wherein the aromatization catalyst has a micropore volume of from about 0.04 cc/g to about 0.10 cc/g.

7. The process of claim 1 wherein the aromatization catalyst has a crush strength of from about 4.5 lbs. (2.0 Kg) to about 15 lbs. (6.8 Kg).

8. A process comprising:
   (a) mixing an L-zeolite, a binder, and water to form a mixture;
   (b) extruding the mixture to form a green extrudate;
   (c) drying the green extrudate to form a dried green extrudate;
   (d) calcining the dried green extrudate to form a support, wherein calcining the dried green extrudate is the first of only two calcination steps in the process;
   (e) washing the support to form a washed support;
   (f) drying the washed support to form a dried washed support;
   (g) calcining the dried washed support to form a second calcined support, wherein calcining the dried washed support is the second of only two calcination steps in the process;
   (h) impregnating the second calcined support with a Group 8-10 transition metal compound and at least one halide-containing compound to form a metalized-halided material; and
   (i) vacuum drying the metalized-halided material to form a dried metalized-halided material which is an aromatization catalyst.

9. The process of claim 8 wherein the Group 8-10 transition metal comprises platinum.

10. The process of claim 8 wherein the at least one halide comprises a fluoride-containing compound, a chloride-containing compound, or a combination thereof.

* * * * *